United States Patent Office

Re. 27,375
Reissued May 30, 1972

27,375

IMAGE RECEPTOR SHEETS CONTAINING ORGANIC SILVER SALTS AND METAL ION IMAGE

Gerhard W. R. Puerckhauer, St. Paul, Burt K. Sagawa, Minneapolis, and Bruce W. Wittnebel, St. Paul, Minn., assignors to Minnesota Mining and Manufacturing Company, St. Paul, Minn.

No Drawing. Original No. 3,460,946, dated Aug. 12, 1969, Ser. No. 524,843, Feb. 3, 1966. Application for reissue July 20, 1970, Ser. No. 56,641

Int. Cl. G03c *1/02*

U.S. Cl. 96—94 13 Claims

Matter enclosed in heavy brackets [ ] appears in the original patent but forms no part of this reissue specification; matter printed in italics indicates the additions made by reissue.

ABSTRACT OF THE DISCLOSURE

Metal ion image amplifiers, such as stannous stearate, are added to image [receptor] sheets containing organic silver salts *and reducing agents,* to provide improved image appearance and to conserve silver.

This invention relates to the graphic copying art and in particular to the preparation and reproduction of office documents and analogous graphic matter. The invention provides a novel image receptor sheet on which images of improved appearance, and particularly having increased optical density, may be produced by known copying or image-duplicating techniques.

A well-known and widely used method for copying office documents is described in Workman U.S. Patent No. 3,094,417. It involves light-exposure of a partially light-transmissive thin photosensitive intermediate sheet material while in reflex position on the printed original, followed by heating of the intermediate in contact with a suitable receptor or image sheet with which the intermediate sheet is visibly reactive. In a preferred system the intermediate contains a photosensitive substituted alpha-naphthol reducing agent for silver ion, and the receptor sheet contains a silver soap of a long chain fatty acid. A visible image is formed through reduction of silver ion by the naphthol. Image appearance may be improved by including with the silver soap one or more image toning materials such as 1(2H)-phthalazinone, as in Grant U.S. Patent No. 3,080,254, or various organic acids as in Owen U.S. Patent No. 3,074,809. Appearance and stability of the recptor sheet are enhanced by incorporation of zinc oxide and polyterpene resin as shown in Wartman U.S. Patent No. 3,107,174. Improved contrast between image and background areas is obtained by incorporating with the silver soap small amounts of certain highly substituted aromatic reducing agents, as described in Reitter U.S. Patent No. 3,218,166.

It has now been discovered that significant improvement in a number of respects may be made in silver soap image receptor sheets as hereinabove identified by incorporating therein, either in addition to or in place of a portion of the silver soap, controlled small amounts of one or more of certain metal salts, of which stannous stearate is an illustrative and preferred example. Addition of such materials in amounts as small as about 150 parts per million of the silver content of the silver soap has been found to overcome or eliminate the usual bluish cast of the image, resulting in a more attractive true black image appearance, and at the same time the image density and contrast are increased. Substitution of relatively very small amounts of the addition compounds for significantly large proportions of the silver soap likewise blackens the image with no decrease or even with some increase in image density, improves the stability of the sheet against background darkening resulting from prolonged exposure to light, and in addition effects a reduction in cost of materials. In both instances the modified receptor sheets are found to have a wider latitude with respect to the conditions under which effective images may be formed thereon, for example with respect to both the extent of light-exposure of the intermediate and also the temperature of final heating.

Stannous stearate, or analogous products containing or consisting of stannous soaps of long chain fatty acids, are particularly desirable in the practice of the invention since the soaps disperse readily with the silver soap in the coating composition, they are essentially colorless so that the background areas remain uncolored, and they are effective in extremely small proportions. Stannous compounds such as the oxalate or sulfate are effective image amplifiers but are more difficult to disperse. Copper salts are approximately equal or slightly superior to the stannous salts in their effect on image density. Gold salts are also highly effective. Salts of iron, manganese, tungsten and uranium are effective where the color of the compound is not deterimental but must be used in somewhat larger proportions to obtain equivalent image densisties. Salts of lead, cobalt, nickel and vanadium are also moderately effective.

The metal iron image amplifier materials represented by the classes of materials just identified will be seen to consist of compounds of metals which can exist in more than one valence state in the form of normally stable compounds. Stannous compounds in relatively large amounts are capable of serving as reducing agents for the silver soap, and sheet materials coated with silver soap compositions containing sufficient amounts of such materials are darkened on heating. Other compounds such for example as cupric stearate are fully as effective as are the stannous compounds for the purposes of the present invention although presumably having no reducing action on the silver ion. In view of the very small amounts of metal ion image amplifiers employed in the practice of the present invention, darkening at the image areas is believed primarily to be due to reduction of the silver ion by the naphthol or other organic reducing agent, the image amplifier serving rather to intensify and modify or tone the image thus produced by some mechanism which does not necessarily involve oxidation-reduction. The amount of amplifier material may be as low as about 150 or even fewer parts per million parts of the silver content, as previously indicated, or may be as high as fifty or even seventy-five percent based on the weight of the silver, with the more effective compounds producing excellent results when used within the preferred range of about 350 to about 4500 parts per million parts of silver. Where the amplifier material is capable of acting as a reducing agent for the silver ion, the amount is far below that required for stoichiometric equivalency with the silver soap.

In addition to the differences in effectiveness between different specific amplifier materials, the manner in which the material is added has an important effect. The silver soap coating compositions normally require prolonged inensive milling, as in a ball mill, to achieve desired smoothness and coating characteristics. It is found that best results are obtained, in terms of increased image density and raw materials economy, by incorporating the powdered metal ion image amplifier material as early as possible in the mixing cycle.

The amplifier material may alternatively be added in solution. As an example, materials such as stannous sulfate which otherwise require intensive grinding prior to incorporation in the silver soap mixture may more effectively be first dissolved in a small amount of water and the solution then introduced into the mixture in the ball mill. Inadequate dispersion of the amplifier is characterized by the formation of dark specks in the receptor sheet coating, as well as by lack of the expected improvement in image tone and density; the procedure eliminates these difficulties.

In comparing the relative effectiveness of analogous receptor sheet structures it is convenient to measure the reflectance optical density (R.O.D.) of image areas produced therein under standardized test conditions. A suitable area is reacted by heating in contact with a segment of an intermediate sheet containing a volatile reducing agent such as 4-methoxy-1-naphthol, and the reflectance optical density of the converted image area is measured. The density value will characteristically be found to be within the approximate range of 1.0 to 1.5. An increase of about three percent in the reading may be detected by visual inspection; increases of as little as about five percent are easily seen; increases of more than about five percent represent a definite and commercially significant improvement.

A receptor sheet in widespread commercial use at the time of the present invention includes a coating consisting essentially of the following components in the indicated parts by weight:

| | |
|---|---|
| Silver behenate:behenic acid (13.5% Ag) | 8.30 |
| Phthalazinone | 2.20 |
| 2,6-ditertiarybutyl-p-cresol | 1.44 |
| Zinc oxide | 11.00 |
| Terpene resin | 2.20 |
| Polymeric film-forming binder | 13.12 |

The composition is applied to a paper substrate from suspension in a volatile liquid vehicle at a concentration of approximately 20 percent non-volatiles and a coating thickness of four mils, and the vehicle removed by evaporation, leaving a smooth uniform non-glossy surface. An intermediate sheet having a thin coating of 4-methoxy-1-naphthol and which has been exposed to light while in contact with an imaged original is placed in contact with the coated surface of the image sheet and the composite is held for six seconds against a smooth metal surface maintained at 125° C. The image sheet is darkened over the image area to a reflectance optical density of 1.07. The darkened area appears dull black with a faintly bluish cast.

The silver behenate:behenic acid mixture contains approximately equal mol proportions of salt and acid, as indicated by the analysis for silver content. Other silver soaps both alone and in admixture with various proportions of various fatty acids may similarly be used. In preparing the coating composition, the silver soap mixture is premilled by ball miling with the zinc oxide in a portion of the vehicle until well dispersed. The remaining components are then added and milling is continued until a smooth uniform thin creamy suspension is obtained.

The same basic formula and test procedure are employed in the following illustrative examples, with the addition of the indicated amount and kind of metal ion image amplifier to the mixture of silver soap and pigment prior to milling. The amount of amplifier is selected, on the basis of preliminary trials, as sufficient to produce a desirable increase in image density at a concentration which does not adversely affect background color.

| Example | Amplifier | Formula wt. | R.O.D. |
|---|---|---|---|
| 1 | Tin stearate (4% stannous, 26% total tin). | .008 | 1.22 |
| 2 | Calcium-tin stearate (9.8% stannous, 11.4% total tin). | .002 | 1.27 |
| 3 | Stannous laurate | .0025 | 1.24 |
| 4 | Stannous oxalate | .00075 | 1.36 |
| 5 | Cupric stearate | .0015 | 1.28 |
| 6 | Ferric stearate | .115 | 1.21 |
| 7 | Tin stearate (17.1% stannous, 22.4% total tin). | .002 | 1.30 |
| 8 | Stannous sulfate | .010 | 1.27 |
| 9 | Cupric acetate | .0005 | 1.38 |
| 10 | Cuprous oxide | .050 | 1.30 |
| 11 | Cupric tartrate | .0005 | 1.38 |
| 12 | Manganese acetate | .71 | 1.50 |
| 13 | Lead acetate | .71 | 1.36 |
| 14 | Cobalt acetate | .24 | 1.30 |
| 15 | Cobalt stearate | .24 | 1.36 |
| 16 | Nickel stearate | .24 | 1.32 |
| 17 | Tungstic oxide | .025 | 1.30 |
| 18 | Uranium acetate | .025 | 1.28 |
| 19 | Uranyl acetate | .025 | 1.32 |
| 20 | Vanadyl sulfate | .24 | 1.36 |
| 21 | Cupric stearate<br>Ferric stearate | .00025<br>.0025 | 1.28 |
| 22 | Manganese stearate<br>Cobalt stearate | .095<br>.095 | 1.25 |
| 23 | Gold resinate (24% Au) | .0035 | 1.25 |

The effect of increasing small amounts of metal ion image amplifier is illustrated by the following reflectance optical density values obtained from sheets prepared, treated and tested as in Example 1 but at various concentrations of the tin stearate.

| Formula wt.: | R.O.D. |
|---|---|
| 0 | 1.07 |
| .005 | 1.10 |
| .008 | 1.22 |
| .048 | 1.28 |

The concentrations indicated will be seen on simple calculation to represent approximately 600, 1000, and 6000 parts by weight respectively of the tin stearate per million parts of the silver soap mixture, or approximately 750, 1100 and 7500 parts respectively of the stannous salt component per million parts of silver content.

Within reasonable limits the coating weight of the composition has been shown to have no effect on the reflectance optical density, identical R.O.D. values being obtained from sheets coated at three- and at four-mil coating apertures. At the latter figure the weight of the dry coating of Example 1 is about 1.25 grams/sq. ft.

Example 24

Example 7 is repeated except that the tin stearate is added after initial prolonged grinding of silver soap and zinc oxide and just prior to addition of the remaining ingredients, so that the mixture containing the amplifier is milled for only a limited time. The reflectance optical density is increased only to 1.21. Approximately the same results are obtained by grinding an excess of the stannous stearate into a portion of the pre-ground mixture of silver soap and zinc oxide, and then blending an aliquot of the grind with a separately prepared mixture containing no tin salt to provide a final coating having a formula weight of .12 part of the salt. A reflectance optical density of 1.22 is obtained.

Example 25

A receptor sheet is prepared and tested as hereinbefore described, using the following formula in which the proportion of silver soap mixture is greatly reduced from that of the previous examples.

| | |
|---|---|
| Silver behenate:behenic acid (13.5% Ag) | 4.98 |
| Phthalazinone | 2.20 |
| 2,6-ditertiarybutyl-p-cresol | 1.14 |
| Zinc oxide | 14.14 |
| Terpene resin | 2.20 |
| Polymeric film-forming binder | 13.12 |
| Tetrachlorophthalic anhydride | .086 |
| Tin stearate of Example 7 | .0018 |

A black image is produced having a reflectance optical density of 1.28.

The tetrachlorophthalic anhydride serves to stabilize the coating composition during grinding and prior to coating and drying, as pointed out in Wingert U.S. Patent No. 3,031,329.

It will be appreciated that the reflectance optical density values reported for the specific examples are comparative only and may be changed considerably with changes in other components and proportions. As an example, major changes in zinc oxide content, or replacement of part or all of the zinc oxide pigment by pigments having significantly different reflectance or hiding power, would be expected to alter the level of density values accordingly. Changes in specific polymers or polymer mixtures employed as the film-forming binder, or changes in the proportion of binder, will likewise affect the optical density of the image. However for receptor sheets of any specific formulation and procedure it will be apparent that the addition of the small amount of stannous soap or other metal ion image amplifier imparts significant improvement to the visual characteristics of the images produced thereon.

What is claimed is as follows:

1. A receptor sheet useful in making a copy of a graphic original by a process involving heating in contact with a photosensitive intermediate sheet containing 4-methoxy-1-naphthol after reflex exposure of said intermediate sheet in contact with said original, said receptor sheet including an imaging layer capable of undergoing a visible change by reduction of silver ion when heated in contact with 4-methoxy-1-naphthol and comprising a silver salt of an organic acid, a ditertiaryalkyl substituted phenol reducing agent, and a metal ion image amplifier.

2. The receptor sheet of claim 1 wherein the image amplifier is a compound of a metal which can exist in more than one valence state and wherein said amplifier is present in an amount of at least about 150 parts per million parts by weight of silver.

3. The receptor sheet of claim 2 wherein the image amplifier is a compound of stannous tin, copper or gold and is present in an amount of at least about 150 parts per million parts by weight of silver.

4. The receptor sheet of claim 3 wherein the silver salt is a silver soap of a long chain fatty acid.

5. The receptor sheet of claim 1 wherein the silver salt is a silver soap of a long chain fatty acid and the metal ion image amplifier includes a fatty acid soap of stannous tin, copper or gold.

6. The receptor sheet as defined in claim 1 wherein the imaging layer contains, in parts by weight, components comprising

| | |
|---|---|
| Silver behenate:behenic acid equimolar mixture | 4–10 |
| Phthalazinone | 1–3 |
| 2,6-ditertiaryalkyl-p-cresol | 1–2 |
| Zinc oxide | 10–25 |
| Terprene resin | 2–5 |
| Polymeric film-forming binder | 10–25 |
| Metal ion image amplifier, at least .0001. | |

wherein said metal ion is stannous tin, copper or gold ion.

7. In the manufacture of a receptor sheet useful in making a copy of a graphic original by a process involving heating in contact with a photosensitive intermediate sheet containing 4-methoxy-1-naphthol after reflex exposure of said intermediate sheet in contact with said original and wherein said receptor sheet includes an imaging layer capable of undergoing a visible change by reduction of silver ion when heated in contact with 4-methoxy-1-naphthol and comprising a silver salt of an organic acid, and a ditertiaryalkyl substituted phenol reducing agent, the method of imparting to said receptor sheet the ability to form images of increased blackness and density comprising incorporating with said silver salt at least about 150 parts, per million parts by weight of silver, of a metal ion image amplifierd which amplifier is a compound of a metal which can exist in each of more than one valence state in a normally stable compound.

8. The method of claim 7 wherein said imaging layer contains a toner for the silver image and wherein said amplifier is a stannous tin, copper, lead or gold compound.

*9. Sheet material including an imaging layer capable of undergoing a visible change by reduction of silver ion when heated with 4-methoxy-1-naphthol and comprising a silver salt of an organic acid, a ditertiaryalkyl substituted phenol reducing agent, and a metal ion image amplifier.*

*10. Sheet material of claim 9 wherein said metal ion image amplifier is present in an amount of at least about 150 parts per million parts by weight of silver.*

*11. Sheet material of claim 10 wherein said imaging layer contains a toner for the silver image and said metal ion image amplifier is a compound of stannous tin, copper, lead or gold.*

*12. Sheet material of claim 11 wherein said toner is phthalazinone and said metal ion image amplifier includes a stannous tin compound.*

*13. In the manufacture of a sheet material having an imaging layer capable of undergoing a visible change by reduction of silver ion when heated with 4-methoxy-1-naphthol and comprising a silver salt of an organic acid and a ditertiaryalkyl substituted phenol reducing agent, the method of imparting to said imaging layer the ability to form images of increased blackness and density comprising incorporating with said silver salt a metal ion image amplifier.*

References Cited

The following references, cited by the Examiner, are of record in the patented file of this patent or the original patent.

UNITED STATES PATENTS

| | | | |
|---|---|---|---|
| 3,094,417 | 6/1963 | Workman | 96—28 |
| 3,218,166 | 11/1965 | Reitter | 96—67 |
| 3,094,619 | 6/1963 | Grant | 117—36.8 |
| 3,152,904 | 8/1964 | Sorensen et al. | 96—94 |
| 3,218,168 | 11/1965 | Workman | 96—67 |
| 3,260,603 | 7/1966 | Reitter | 96—67 |
| 3,328,167 | 6/1967 | Owen | 96—67 |
| 2,910,377 | 10/1958 | Owen | 96—36.8 |

GEORGE F. LESMES, Primary Examiner

J. P. BRAMMER, Assistant Examiner

U.S. Cl. X.R.

96—67; 99—118; 117—34